F. WEGMANN.
Machine for Preparing and Treating Middlings.
No. 199,605. Patented Jan. 22, 1878.
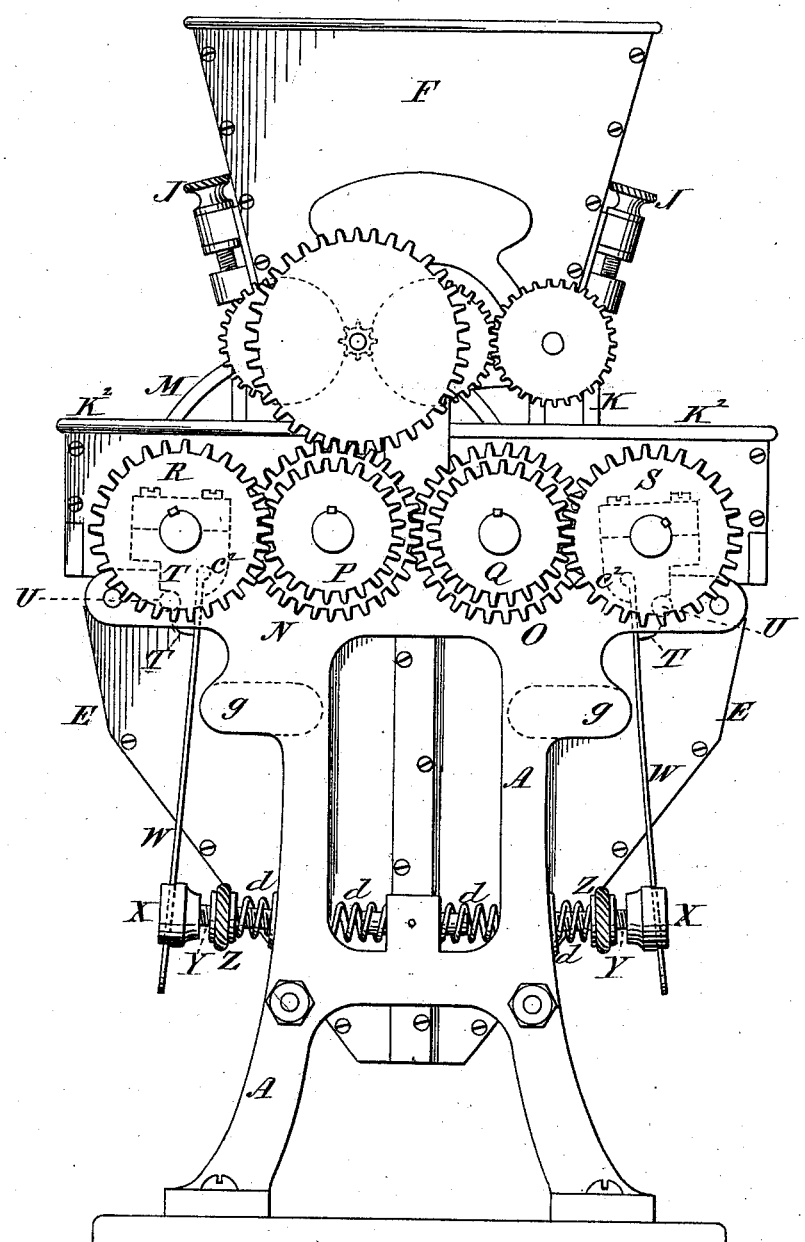

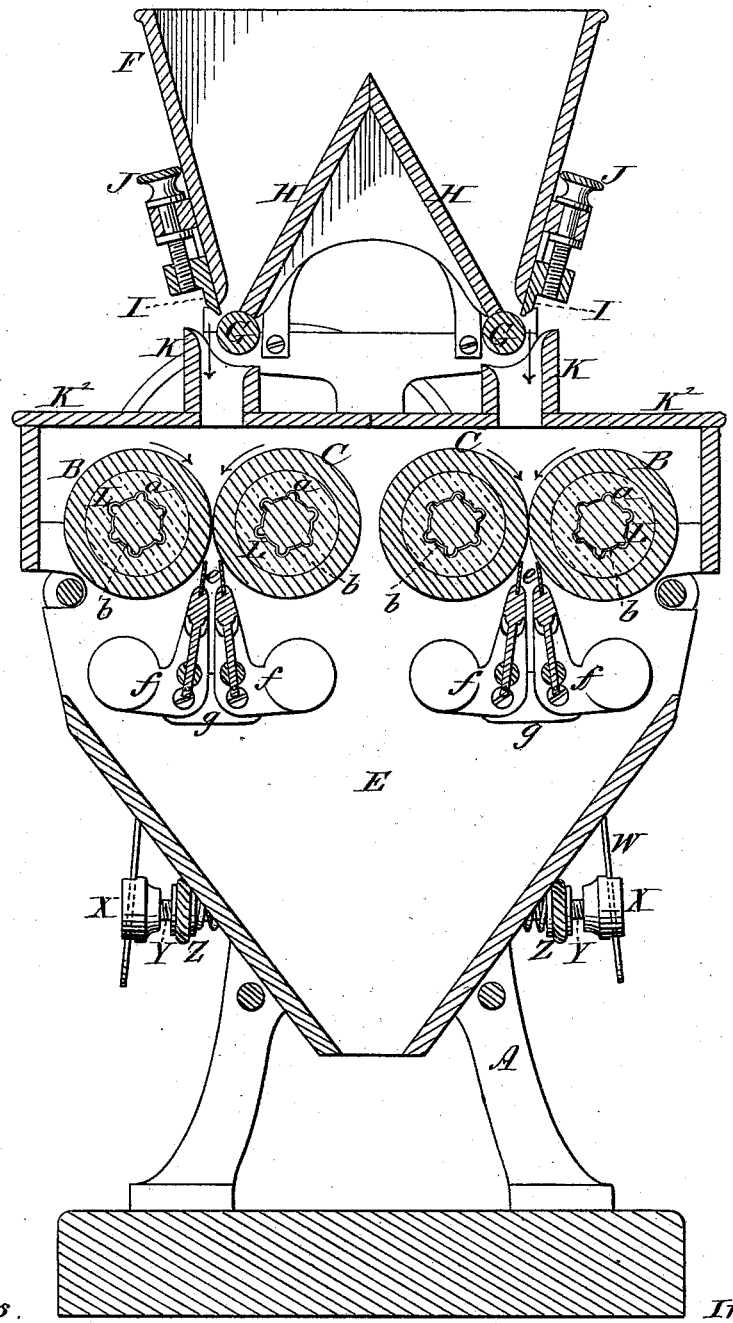

3 Sheets—Sheet 3.
F. WEGMANN.
Machine for Preparing and Treating Middlings.
No. 199,605. Patented Jan. 22, 1878.
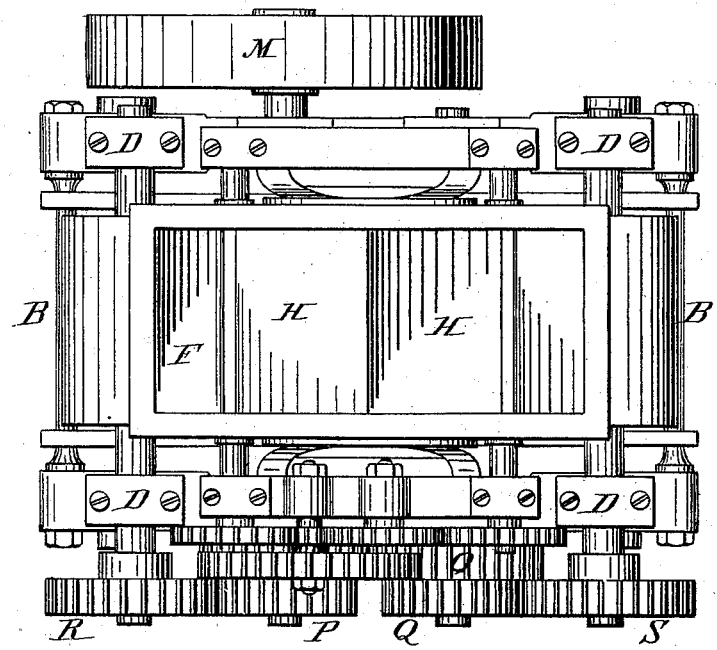
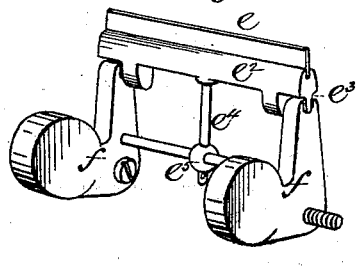
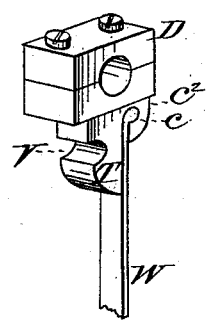
Witnesses:
Floyd Norris
D. P. Cowl
Inventor:
Federigo Wegmann
by Johnson and Johnson
Attys

UNITED STATES PATENT OFFICE.

FEDERIGO WEGMANN, OF NAPLES, ITALY.

IMPROVEMENT IN MACHINES FOR PREPARING AND TREATING MIDDLINGS.

Specification forming part of Letters Patent No. 199,605, dated January 22, 1878; application filed August 22, 1877.

*To all whom it may concern:*

Be it known that I, FEDERIGO WEGMANN, of the city of Naples, in the Kingdom of Italy, have invented certain new and useful Improvements in Machines for Preparing and Treating Middlings, which improvements are fully set forth in the following specification and accompanying drawings.

My present improvements relate to the machine for crushing meal or flour for which Letters Patent of the United States were granted to me September 12, 1876, No. 182,250, and which embraces, among other things, the distinguishing novelty of treating and preparing meal or middlings by porcelain or china rolls, for effecting the reduction of the granular particles known as "middlings" or "semolina" into flour, to increase the yield and produce flour of a superior quality.

The porcelain or china rolls have a differential speed, the object whereof is to obtain a slight tearing action of the woody bran particles during the squeezing pressure of the smooth-surfaced rolls, which greatly facilitates the reduction of the starchy and glutinous particles, and is still not sufficiently severe to pulverize the woody bran particles, germs, and other foreign substances contained in the middlings which ought not to be pulverized. Owing to this peculiar action, the flour produced is of a very superior quality in every particular, and especially its baking quality is raised by the perfectly cool porous action of the smooth porcelain rolls.

These porcelain rolls are also well adapted for a preparing process before submitting the wheat to the grinding action, and when so used they are only driven by friction, owing to the peculiar porosity of the roll-surfaces.

A non-conducting bed of sulphur is cast upon the roll core or shaft, between the porcelain coating and a thin sheet of paper or other suitable similar material glued around said core, and interlocked therewith by recesses or projections thereon, the object of which is to obtain the best bed for the porcelain, and a means for holding it fast to the iron core, the cohesive quality of the sulphur being well known.

Scrapers having a pivotal action and self-adjusting are adapted for use with the porcelain rolls, so as to keep in the most perfect manner the rolls free from accumulations, and prevent all possible undue friction and imperfect action of the scrapers upon the rolls, as it is of great importance that the surfaces of the rolls should be kept clear for their proper crushing action.

I have also improved the construction and devices for regulating and maintaining the pressure of the crushing-rolls, and to render such action more certain, and to obtain the best results.

In the accompanying drawings, Figure 1 represents an elevation of the gearing side of my improved machine for crushing middlings; Fig. 2, a vertical section of the same; Fig. 3, a top view of the same, the roll-hoppers being removed; Fig. 4, one of the roll-scrapers detached; and Fig. 5, one of the adjustable roll-box bearings detached, showing its connection with the spring-lever.

The frame of the machine consists of two open side standards, A, preferably of iron, joined together by cross-ties, and upon the top of which porcelain or china coated rolls B C are suitably mounted in pairs in bearing-boxes D. Between these side standards a receiving-box, E, is secured, into which the middlings drop from the rolls, and with which box suitable contrivances may be adapted for conveying the treated middlings for subsequent separating process or operation for turning them into flour ready for use, and into clean bran.

A double-inclined bottomed hopper, F, is suitably supported upon the side standards above the rolls, and centrally between pairs thereof, for receiving the middlings or meal and conducting it between the pairs of rolls.

Feed-rolls G, of porcelain, wood, or metal, are arranged at the junction of the double-inclined bottom H with the hopper sides, as shown in Fig. 2, which, in connection with adjustable slides I I, allow the meal to issue from regulated openings, as indicated by the arrows in Fig. 2, and deliver it between the crushing-rolls. The slides are adjusted by means of thumb-screws J, suitably secured to the ends of the supply-hopper. To insure the proper delivery of the middlings between the crushing-rolls, supplemental hoppers K are arranged upon the box, with casings $K^2$ for the crushing-rolls, forming a close cover, to exclude the dust, &c. The outer sides of these hoppers rise nearly to the top of the feed-rolls, to properly direct the fall of the middlings. These supplemental hoppers and their casings are made removable, to give access to the crushing-rolls, when desired.

The crushing-rolls are coated with porcelain or other equivalent silicious substance, laid or formed upon non-conducting beds, and when perfectly hard they are turned cylindrical and with polished surfaces by means of diamond tools, which can alone produce the desired results of a perfectly true and finely-dressed surface.

The non-conducting bed L I prefer to make of sulphur, because of its property of permanent and tenacious adherence to the porcelain coating, so that separation from any cause is practically impossible, and because it is almost practically free from expansion and contraction, with other qualities best suited for the porcelain coating. To render the non-conducting sulphur bed fast upon the metal shaft or core, the latter has grooves or projections $a$ on its surface, around which is glued or otherwise secured a thin sheet of paper, $b$, Fig. 2, or equivalent thin substance, so that it is impossible for it to turn upon the core; and upon this thin glued layer the sulphur is cast, so that it is thereby rendered fast upon the core, and separation of the sulphur either at its union with the porcelain or metal core is made impossible from any cause. This permanent fixing of the porcelain coating upon its metal core is very important.

The differential speed of the rolls, and the manner of effecting the adjustment of one of each pair, will now be described.

The two inner rolls C are preferably mounted in fixed boxes, and to the shaft of one the driving-pulley M is fixed, a spear-gear, N, Fig. 1, being fixed upon the opposite end of said shaft, and meshing with a gear, O, of equal diameter on the shaft of the outer non-adjusting roll, imparting a like speed to these two rolls. Two other pinions, P and Q, are keyed on the shafts of the non-adjusting rolls, and they are of greater or less diameter than the gears first described. The shafts of the other rolls are mounted in adjustable bearing-boxes, Fig. 5, and carry pinions R and S, which work into the gears P and Q; and as the diameters of these two pairs of gears vary, a differential speed is therefore imparted to the rolls, (in the example shown the non-adjusting rolls have the accelerated speed,) the effect of which is a slight tearing action by the smooth porcelain surfaces while squeezing the bran, and thereby helps greatly to the speedy reduction of the starchy and glutinous particles, without the least grinding action, as by the porcelain rolls the pulverization of the middlings is not effected, but rather a pulling and flattening action upon all the particles passing through them, in a way to give the most satisfactory results in freeing the flour adhering to the bran.

I do not confine myself to the above-described arrangement of the porcelain crushing-rolls, or to the means for producing their differential speed, as the same may be varied without departing from the spirit of my invention. Thus, I may employ two sets of porcelain rolls, one set being arranged above the other, and passing the middlings twice through the crushing action; or I may arrange the adjustable rolls above the non-adjusting rolls.

The boxes D of the adjusting crushing-rolls have each an extension or arm, T, which, passing through an opening in the top of the standards, is mounted upon a fulcrum-pin, U, Fig. 1, which crosses said opening, and upon which the box is supported by means of shoulders or a socket, V, Fig. 5, in one side of said arm, which fits over said fulcrum-pin, while a spring-lever, W, has its upper end secured in a socket, $c$, in a short arm, $c^2$, or otherwise connected with the opposite side of said box-arm, as shown in Figs. 1 and 5, and, depending therefrom in contact with the long arm T, has a bearing and connection at its lower end within the grooved head X of a screw, Y, upon the stem of which is a milled-head nut, Z, which bears against a coiled spring, $d$, supported in the standard, and into which the screw-stem extends.

The effect of this construction and arrangement is that the adjustable boxes D and their adjusting spring-levers are in separate and distinct parts, and simply socketed together, so that the spring-levers bear upon the long box-arm T, and which, in turn, having their bearings upon the fulcrum-pins, will constantly tend to press the adjustable roll B against the non-adjustable roll with a pressure regulated by the adjustment of the milled-head nut upon the screw-stem.

The screwing up of the milled-head nut Z upon the spring $d$ throws the force upon the fulcrum-pin, and increases the pressure of the crushing-surfaces of the rolls by forcing the screw outward, and the unscrewing of said nut decreases the pressure upon the spring-levers. This gives a very simple and effective means of adjustment and pressure for the rolls, and allows them to separate to let foreign matters pass without injury to the rolls.

The scrapers $e$ are mounted upon weighted levers $f$, which are pivoted to boss projections $g$ of the standards, as shown in Figs. 2 and 4, in a manner to maintain the scrapers in contact with the rolls with a suitable pressure.

These scrapers may be made of any material best adapted for the purpose. Their connection with the lever-arms is not fixed, but is peculiar in this, that the scraper-carrier $e^2$ has rounded edge bearings $e^3$ at each end, seated in corresponding notches or grooves in the upper ends of the lever-arms $f$, so that, in connection with a middle swiveling-post, $e^4$, passing through a socket-rod, $e^5$, connecting the weighted levers, allows the scrapers to have capacity for a compound self-adjustment—that is, either end may move with its weighted lever independent of the other, so that there will be no undue friction or unequal pressure of the scrapers upon the surface of the rolls. The adjustment of the scrapers in connection with the adjustment of the rolls co-operates to keep the contact constant.

The use of porcelain rolls in connection with their differential speed renders the purification of middlings complete by the roller process—a result as to extent and thoroughness, so far as I know, not hitherto obtained.

The peculiar porous surface of the porcelain rolls is of vital importance in producing the result stated. Besides, they give advantages in saving motive power; in producing flour of a superior quality; both in color and strength; in durability, being almost free from wear; in great safety as regards fire, even should the rolls run empty.

When used for preparing the wheat before submitting it to the grinding action, no differential speed is required, and the pinions on the adjustable rollers are taken off the shafts, and then these rollers will only be driven by friction, owing to the peculiar porosity of the material.

The wheat can be merely slightly touched, so as to open only the crease for further cleaning process, and in this way no flour is produced; or, if a stronger pressure is put on, the wheat may be crushed to a very fair extent. When used for this purpose, care should be taken that a uniform feed be always kept on the rolls.

The dimensions of the machine are five feet six inches high, two feet ten inches wide, and three feet six inches long, more or less, with a speed of driving-pulley about one hundred and eighty revolutions per minute. The diameter of the driving-pulley is twenty-three and five-eighths inches, with a face of three and one-eighth inches.

The capacity varies, according to the quality of the middlings, from two and one-half to three and one-half hundred-weight per hour. The power required to drive it is about one and a half horse-power, and the weight of the machine about thirteen hundred weight.

A series of pinions communicate motion to the feeding-rolls, as shown in Fig. 1.

I claim—

1. The combination, in rolls for treating meal or middlings, of a porcelain or china surface, a metal core, and a sulphur bed or layer, interposed between the metal and the porcelain, for the purpose stated.

2. The combination, in rolls for treating meal or middlings, of a porcelain or china surface, a metal core, a sulphur bed or layer, and a paper or similar layer glued upon said core, for the purpose stated.

3. In a machine for treating meal or middlings, the crushing-rolls, having porcelain or china coating or surface upon a sulphur bed, a core layer of paper or like material, and core grooves or projections, whereby both the porcelain coating and the paper layer are held fast to each other and to the metal core.

4. The scraper-carrier $e^2$, connected by tongue-and-groove bearings with weighted levers, in combination with a pivot-stem connection, $e^4$, with said levers, substantially as and for the purpose herein set forth.

5. The self-adjusting crushing-roll bearing-boxes D, fulcrumed upon the fixed pins U, in combination with the spring-levers W, socketed in said boxes, and bearing upon the long arms T thereof, as set forth.

6. The self-adjusting crushing-rolls, supported in bearings fulcrumed upon fixed pins U, and connected by socket-joints with spring-levers W, bearing upon the long box-arms T, in combination with the screws Y, the springs, and the screw-bearing nuts Z, substantially as herein set forth.

FEDERIGO WEGMANN. [L. S.]

Witnesses:
 W. MEYRI,
 T. BIRCHER.